United States Patent [19]
Curtice

[11] Patent Number: 5,921,319
[45] Date of Patent: Jul. 13, 1999

[54] METHODS OF TERMINATING WATER FLOW IN A SUBTERRANEAN FORMATION

[75] Inventor: Richard J. Curtice, Vernal, Utah

[73] Assignee: Halliburton Energy Services, Inc., Duncan, Okla.

[21] Appl. No.: 08/948,899

[22] Filed: Oct. 10, 1997

[51] Int. Cl.$^6$ .................................................. A47B 43/00
[52] U.S. Cl. ..................... 166/279; 166/293; 405/117; 405/266; 405/270
[58] Field of Search ..................... 166/279, 292, 166/293; 405/80, 107, 116, 117, 266, 270

[56] References Cited

U.S. PATENT DOCUMENTS

| | | | |
|---|---|---|---|
| 4,466,833 | 8/1984 | Spangle | 106/88 |
| 5,238,064 | 8/1993 | Dahl et al. | 166/293 |
| 5,325,922 | 7/1994 | Cowan et al. | 166/293 |
| 5,343,950 | 9/1994 | Hale et al. | 166/293 |
| 5,343,952 | 9/1994 | Cowan et al. | 166/292 X |
| 5,370,185 | 12/1994 | Cowan et al. | 166/293 |
| 5,580,379 | 12/1996 | Cowan | 166/293 X |

OTHER PUBLICATIONS

Cementing; Smith, Dwight, K., Revised Edition, Second Printing 1990.
Worldwide Cementing Practices; Smith, Dwight, K., Special Book Project API Project 88–59, 1991.

*Primary Examiner*—Roger Schoeppel
*Attorney, Agent, or Firm*—Craig W. Roddy

[57] ABSTRACT

This invention relates to methods of using environmentally friendly cementitious compositions for terminating water flow in a subterranean formation such as in a fresh water zone or water aquifer. Preferred compositions of the present invention include a hydraulic cementitious material such as Portland cement, a viscosifying agent such as bentonite which increases the viscosity of the composition in the presence of water, and a vegetable oil.

21 Claims, No Drawings

METHODS OF TERMINATING WATER FLOW IN A SUBTERRANEAN FORMATION

BACKGROUND OF THE INVENTION

1. Field of the Invention

This invention relates to methods of terminating water flow in subterranean formations during drilling operations and, more particularly, to methods of using an environmentally friendly composition comprising a hydraulic cement, a viscosifying agent and a vegetable oil for shutting off water flow in fresh water zones, water aquifers and the like.

2. Description of the Prior Art

In the operation of wells used in the recovery of fluids from or the introduction of fluids into subterranean formations problems relating to the unwanted passage of water from undesirable locations in the formation or well bore sometimes occur. This unwanted passage of water can severely disrupt or in fact terminate the desired operation of a well.

To be more specific, the problems ordinarily involve the movement of water through very small undesirable openings. These problems are not unique and the solutions have traditionally involved apparatus, methods and compositions adapted to cover, seal or to otherwise plug the openings to thereby terminate the unwanted passage of fluid therethrough. The openings referred to above include: holes or cracks in well casing; spaces such as holes, cracks, voids or channels in the cement sheath deposited in the annular space between the formation face and well casing; very small spaces called microannuli between the cement sheath, referred to above, and the exterior surface of the well casing or formation; and permeable spaces in gravel packs and formations.

Conventional substances used in sealing or plugging the holes or cracks have included diesel oil cements which are comprised of an API Class cement, a surface-active agent and diesel oil or kerosene. These diesel oil type cements do not set until they are placed in a water-bearing zone where they absorb water and set. Furthermore, the use of a substance containing diesel oil or kerosene is not always environmentally desirable for use in terminating water flow in a fresh water zone or water aquifer.

During the construction of a well it is known to place a volume of a slurry of hydraulic cement into the annular space between the walls of the borehole and the exterior of the casing wherein the cement, is permitted to solidify to thereby form an annular sheath of hardened cement. The objective of the sheath, the construction of which is referred to as primary cementing, includes physical support and positioning of the casing in the borehole and prevention of unwanted fluid (liquid and gas) migration between various formations penetrated by the well bore. If, for some reason, the hardened sheath contains spaces such as voids, cracks or channels due to problems involved in the placement of the slurry it is clear that the sheath may not be capable of providing the desired objectives. Accordingly, by employing known techniques to locate the voids, channels or cracks, a perforation penetrating the spaces can be made in the casing and sheath and a cementitious material then squeezed into the spaces via the perforation so as to place the sheath in a more desirable condition for protecting and supporting the casing and providing fluid flow control.

Another problem incidental to the formation of the cement sheath, referred to above, revolves about the occasional failure of the sheath to tightly bond to the exterior wall of the casing or the interior of the borehole. This failure can produce a very thin annular space called a microannulus between the exterior wall of the casing and the sheath or the sheath and the borehole. For the reasons already discussed, it is important to place a substance, such as a hydraulic cementitious material, in the microannulus to enable the sheath to fully provide the intended benefits.

Still another problem involved in the operation of wells which are the subject of this invention, revolves about the unwanted movement of water via cracks and fractures in the subterranean formation—whether naturally occurring or deliberately produced—from the formation into the well bore. Terminating this water movement may require remedial efforts other than those referred to previously which feature plugging perforations, holes, cracks and the like in casing, cement sheath and gravel packs—all of which occur within the confines of the well borehole itself. However, with use of the methods and compositions of this invention the unwanted movement of water from cracks and fractures in the formation outside of the well borehole itself may be prevented.

The problems referred to above explain how the unwanted passage of fluids, such as water, can occur in a well. Solutions to these and similar problems, according to this invention, involve the methods of using an environmentally friendly composition comprising hydraulic cement, a viscosifying agent and vegetable oil.

SUMMARY OF THE INVENTION

The present invention provides environmentally friendly compositions for terminating water flow in subterranean formations and methods of using the compositions which meet the needs described above and overcome the deficiencies of the prior art. A preferred well cement composition of this invention is comprised of a hydraulic cementitious material, a viscosifying agent which effectively increases the viscosity of the composition in the presence of water, and a vegetable oil.

The methods of the invention basically comprise the steps of introducing a well cement composition of this invention, which sets into a high bond strength solid mass in the presence of water, into a subterranean formation and allowing the cement composition to set therein.

It is, therefore, a general object of the present invention to provide improved cement compositions and methods for use in terminating water flow in subterranean formations or well bores penetrating such formations.

Other and further objects, features and advantages of the present invention will be readily apparent to those skilled in the art upon a reading of the description of preferred embodiments which follows.

DETAILED DESCRIPTION OF THE INVENTION

The solutions to the problems discussed above broadly relate to: remedial cementing operations conducted inside a well bore, remedial cementing operations conducted outside a well bore in a subterranean formation and primary cementing operations conducted during construction of a well. The solutions to these problems, according to this invention, basically feature the practice of well cementing methods long accepted for confronting and solving these problems with one substantial change. The substantial change in the conventional methods of terminating water flow is the use of preferred novel compositions comprising a hydraulic material, a viscosifying agent such as clay which increases the viscosity of the composition in the presence of water, and vegetable oil.

Any suitable hydraulic material may be used which effectively permits the composition to set into a relatively hard impermeable mass in the presence of water. More particularly, a hydraulic cement such as Portland cement is the most preferred hydraulic material for use in the present composition and can be one or more of the various Portland cements designated as API Classes A–H. These cements are identified and defined in the *API Specification For Materials And Testing For Well Cements,* API Specification 10 fifth edition, dated Jul. 1, 1990, of the American Petroleum Institute. The hydraulic material is preferably present in the composition in the range of from about 17 to about 31 percent by weight of the composition.

Any suitable viscosifying agent may be used which effectively increases the viscosity of the composition in the presence of water. Preferably, a clay such as bentonite, attapulgite or the like is used in the composition of the present invention. The viscosifying agent is preferably present in the composition in the range of from about 18 to about 33 percent by weight of the composition.

Vegetable oils are generally defined herein as oils that are extracted from plants and, more preferably, oils extracted from the seeds, fruits or nuts of plants and generally considered to be a mixture of mixed glycerides. The vegetable oils which are particularly suitable for use in accordance with the present invention are selected from the group of corn oil, peanut oil, canola oil, olive oil, soybean oil, sunflower oil and cottonseed oil. The vegetable oil is preferably present in the composition in the range of from about 35 to about 65 percent by weight of the composition.

One other particular advantage, in addition to terminating water flow as described herein, is that the present cementitious compositions are environmentally friendly and safe for use in fresh water zones and aquifers. In addition, the compositions of this invention, as previously mentioned, are very useful to penetrate, fill and harden in fine holes, cracks and spaces such as might be expected to be found in well casing, cement sheaths, gravel packs and subterranean formations in the vicinity of a well bore. Accordingly, a condition known as water coning, in which water from a subterranean formation enters the well bore in a rising or coning fashion, can be terminated by squeezing a cementitious composition of this invention into formations producing such water, wherein the slurries are allowed to absorb water and set therein.

Further, a cementitious composition of this invention can be formulated to penetrate, plug and set in fine cracks in well pipe and in channels and microannulus spaces in and around the cement sheath wherein water shut-off is desired.

The usual well cementing additives may also be combined with the cementitious materials of this invention to achieve the usual results, i.e., dispersants, defoaming agents, fluid loss additives, lost circulation additives, expansion additives, hardening accelerators (although, not normally required), hardening retarders which may be particularly useful when high temperature environments are encountered, and lightweight additives such as gases, perlite, fly ash, silica fume, microspheres and the like.

Subterranean formations sometimes produce unwanted water from natural fractures as well as from fractures produced by forces applied deliberately or accidentally during production operations. It is known that such fractures provide a path of least resistance to the flow of fluid from a formation to a well bore. When the fluid flowing in a fracture is primarily oil, the fracture is considered to be beneficial and thus desirable; however, when the fluid flowing in the fracture from the formation to the well bore is primarily water the fracture is considered to be a problem and thus undesirable. By the method of this invention, an undesirable fracture which is applied deliberately or accidentally during operations can be filled with the cementitious composition of the present invention to plug it and thereby terminate the flow of fluid therein.

The hydraulic cement of this invention can be placed in a subterranean fracture as well as in a high permeability zone of the formation by the application of conventional procedures, but the cement itself must be rendered temporarily non-reactive by preventing contact between it and water prior in time to actual placement of the cement into the fracture. Accordingly, the cement of this invention contains a relatively low viscosity, relatively non-volatile liquid hydrocarbon, such as vegetable oil, to form a pumpable slurry of cement in oil. A preferred slurry density is in the range of from about 10 to about 13.5 pounds per gallon.

The slurry is then introduced into the fracture. After the slurry is in the fracture, water flowing in the fracture slowly contacts the hydraulic cement to thereby render the cement reactive so as to initiate hydration, hardening and ultimate formation of a permanent plug in the fracture. By this technique the cement in the slurry will only set when contacted by water in the fracture and thus will not set if the slurry enters a fracture containing oil. Accordingly, oil producing portions of a reservoir will remain relatively damage free after water flow is terminated.

The methods of this invention for cementing a subterranean formation basically comprise the steps of forming a well cement composition comprised of a hydraulic cementitious material, a viscosifying agent, and vegetable oil; pumping the cement composition into the subterranean formation by way of a well bore; contacting the composition with water from the formation; and allowing the cement composition to set into an impermeable mass therein.

In order to further illustrate the improved cement compositions and methods of this invention, the following examples are given in Tables I–VII below. Test slurries of the cement compositions of this invention are comprised of either Type V or Class H Portland cement, clay and a vegetable oil. Descriptions of the test samples are set forth in the Tables. The test samples were then measured for the amount of time it takes for the slurry to effectively become non-flowable after the addition of water.

TABLE I

COMPOSITION CONTAINING PORTLAND CEMENT, BENTONITE AND CORN OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 16.80 | Bentonite | 17.87 | Corn | 115.83 | 9.0 | 50 | DNS[2] |
| Portland | 21.52 | Bentonite | 22.89 | Corn | 105.59 | 9.5 | 50 | DNS[2] |

TABLE I-continued

COMPOSITION CONTAINING PORTLAND CEMENT, BENTONITE AND CORN OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 25.76 | Bentonite | 27.41 | Corn | 96.83 | 10.0 | 50 | 0:04 |
| Portland | 29.61 | Bentonite | 31.50 | Corn | 88.90 | 10.5 | 50 | 0:04 |
| Portland | 33.10 | Bentonite | 35.21 | Corn | 81.69 | 11.0 | 50 | 0:03 |
| Portland | 36.29 | Bentonite | 38.61 | Corn | 75.11 | 11.5 | 50 | 0:02 |
| Portland | 39.21 | Bentonite | 41.72 | Corn | 69.07 | 12.0 | 50 | 0:02 |
| Portland | 41.90 | Bentonite | 44.58 | Corn | 63.52 | 12.5 | 50 | 0:02 |
| Portland | 44.39 | Bentonite | 47.22 | Corn | 58.40 | 13.0 | 50 | 0:02 |
| Portland | 46.68 | Bentonite | 49.66 | Corn | 53.65 | 13.5 | 50 | NP[3] |
| Portland | 48.82 | Bentonite | 51.94 | Corn | 49.25 | 14.0 | 50 | NP[3] |

[1]The amount of time it takes for the slurry to effectively become non-flowable after the addition of water.
[2]"DNS" indicates that the slurry did not contain enough solids to get a consistent set (i.e., did not set).
[3]"NP" indicated that the slurry is to thick to pump (i.e., non-pumpable).

TABLE II

COMPOSITION CONTAINING PORTLAND CEMENT, BENTONITE AND SOY BEAN OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 16.80 | Bentonite | 17.87 | Soy Bean | 115.33 | 9.0 | 50 | DNS[2] |
| Portland | 21.52 | Bentonite | 22.89 | Soy Bean | 105.59 | 9.5 | 50 | DNS[2] |
| Portland | 25.76 | Bentonite | 27.41 | Soy Bean | 96.83 | 10.0 | 50 | 0:04 |
| Portland | 29.61 | Bentonite | 31.50 | Soy Bean | 88.90 | 10.5 | 50 | 0:03 |
| Portland | 33.10 | Bentonite | 35.21 | Soy Bean | 81.69 | 11.0 | 50 | 0:03 |
| Portland | 36.29 | Bentonite | 38.61 | Soy Bean | 75.11 | 11.5 | 50 | 0:02 |
| Portland | 39.21 | Bentonite | 41.72 | Soy Bean | 69.07 | 12.0 | 50 | 0:02 |
| Portland | 41.90 | Bentonite | 44.58 | Soy Bean | 63.52 | 12.5 | 50 | 0:02 |
| Portland | 44.39 | Bentonite | 47.22 | Soy Bean | 58.40 | 13.0 | 50 | 0:02 |
| Portland | 46.68 | Bentonite | 49.66 | Soy Bean | 53.65 | 13.5 | 50 | 0:02 |
| Portland | 48.82 | Bentonite | 51.94 | Soy Bean | 49.25 | 14.0 | 50 | 0:02 |

[1]The amount of time it takes for the slurry to effectively become non-flowable after the addition of water.
[2]"DNS" indicates that the slurry did not contain enough solids to get a consistent set (i.e., did not set).

TABLE III

COMPOSITION CONTAINING PORTLAND CEMENT, BENTONITE AND CANOLA OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 16.80 | Bentonite | 17.87 | Canola | 115.83 | 9.0 | 50 | DNS[2] |
| Portland | 21.52 | Bentonite | 22.89 | Canola | 105.59 | 9.5 | 50 | DNS[2] |
| Portland | 25.76 | Bentonite | 27.41 | Canola | 96.83 | 10.0 | 50 | 0:04 |
| Portland | 29.61 | Bentonite | 31.50 | Canola | 88.90 | 10.5 | 50 | 0:04 |
| Portland | 33.10 | Bentonite | 35.21 | Canola | 81.69 | 11.0 | 50 | 0:03 |
| Portland | 36.29 | Bentonite | 38.61 | Canola | 75.11 | 11.5 | 50 | 0:03 |
| Portland | 39.21 | Bentonite | 41.72 | Canola | 69.07 | 12.0 | 50 | 0:02 |
| Portland | 41.90 | Bentonite | 44.58 | Canola | 63.52 | 12.5 | 50 | 0:02 |
| Portland | 44.39 | Bentonite | 47.22 | Canola | 58.40 | 13.0 | 50 | 0:02 |
| Portland | 46.68 | Bentonite | 49.66 | Canola | 53.65 | 13.5 | 50 | NP[3] |
| Portland | 48.82 | Bentonite | 51.94 | Canola | 49.25 | 14.0 | 50 | NP[3] |

[1]The amount of time it takes for the slurry to effectively become non-flowable after the addition of water.
[2]"DNS" indicates that the slurry did not contain enough solids to get a consistent set (i.e., did not set).
[3]"NP" indicated that the slurry is to thick to pump (i.e., non-pumpable).

TABLE IV

COMPOSITION CONTAINING PORTLAND CEMENT, BENTONITE AND SUNFLOWER OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 21.52 | Bentonite | 22.89 | Sunflower | 105.59 | 9.5 | 50 | DNS[2] |
| Portland | 25.76 | Bentonite | 27.41 | Sunflower | 96.83 | 10.0 | 50 | 0:04 |
| Portland | 29.61 | Bentonite | 31.50 | Sunflower | 88.90 | 10.5 | 50 | 0:03 |
| Portland | 33.10 | Bentonite | 35.21 | Sunflower | 81.69 | 11.0 | 50 | 0:02 |
| Portland | 36.29 | Bentonite | 38.61 | Sunflower | 75.11 | 11.5 | 50 | 0:02 |
| Portland | 39.21 | Bentonite | 41.72 | Sunflower | 69.07 | 12.0 | 50 | 0:02 |
| Portland | 41.90 | Bentonite | 44.58 | Sunflower | 63.52 | 12.5 | 50 | 0:02 |
| Portland | 44.39 | Bentonite | 47.22 | Sunflower | 58.40 | 13.0 | 50 | 0:02 |

[1]The amount of time it takes for the slurry to effectively become non-flowable after the addition of water.
[2]"DNS" indicates that the slurry did not contain enough solids to get a consistent set (i.e., did not set).

TABLE V

COMPOSITION CONTAINING PORTLAND CEMENT, BENTONITE AND PEANUT OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 21.52 | Bentonite | 22.89 | Peanut | 105.59 | 9.5 | 50 | DNS[2] |
| Portland | 25.76 | Bentonite | 27.41 | Peanut | 96.83 | 10.0 | 50 | 0:04 |
| Portland | 29.61 | Bentonite | 31.50 | Peanut | 88.90 | 10.5 | 50 | 0:03 |
| Portland | 33.10 | Bentonite | 35.21 | Peanut | 81.69 | 11.0 | 50 | 0:02 |
| Portland | 36.29 | Bentonite | 38.61 | Peanut | 75.11 | 11.5 | 50 | 0:02 |
| Portland | 39.21 | Bentonite | 41.72 | Peanut | 69.07 | 12.0 | 50 | 0:02 |
| Portland | 41.90 | Bentonite | 44.58 | Peanut | 63.52 | 12.5 | 50 | 0:02 |
| Portland | 44.39 | Bentonite | 47.22 | Peanut | 58.40 | 13.0 | 50 | NP[3] |

[1]The amount of time it takes for the slurry to effectively become non-flowable after the addition of water.
[2]"DNS" indicates that the slurry did not contain enough solids to get a consistent set (i.e., did not set).
[3]"NP" indicated that the slurry is to thick to pump (i.e., non-pumpable).

TABLE VI

COMPOSITION CONTAINING PORTLAND CEMENT, BENTONITE AND OLIVE OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 25.76 | Bentonite | 27.41 | Olive | 96.83 | 10.0 | 50 | 0:03 |
| Portland | 29.61 | Bentonite | 31.50 | Olive | 88.90 | 10.5 | 50 | 0:03 |
| Portland | 33.10 | Bentonite | 35.21 | Olive | 81.69 | 11.0 | 50 | 0:02 |
| Portland | 36.29 | Bentonite | 38.61 | Olive | 75.11 | 11.5 | 50 | 0:02 |
| Portland | 39.21 | Bentonite | 41.72 | Olive | 69.07 | 12.0 | 50 | 0:02 |
| Portland | 41.90 | Bentonite | 44.58 | Olive | 63.52 | 12.5 | 50 | 0:02 |
| Portland | 44.39 | Bentonite | 47.22 | Olive | 58.40 | 13.0 | 50 | 0:02 |

[1]The amount of time it takes for the slurry to effectively become non-flowable after the addition of water.

TABLE VII

COMPOSITION CONTAINING PORTLAND CEMENT, ATTAPULGITE AND SOY BEAN OIL

| Type of Cement | Amount of Cement (grams) | Type of Viscosifying Agent (Clay) | Amount of Clay (grams) | Type of Oil (100%) | Amount of Oil (grams) | Slurry Weight (lbs/gal) | Water Added (mls) | Set[1] Time (min:sec) |
|---|---|---|---|---|---|---|---|---|
| Portland | 16.44 | Attapulgite | 17.49 | Soy Bean | 116.07 | 9.0 | 50 | DNS[2] |
| Portland | 21.06 | Attapulgite | 22.40 | Soy Bean | 106.54 | 9.5 | 50 | DNS[2] |
| Portland | 25.21 | Attapulgite | 26.82 | Soy Bean | 97.96 | 10.0 | 50 | 0:04 |
| Portland | 28.98 | Attapulgite | 30.83 | Soy Bean | 90.20 | 10.5 | 50 | 0:03 |
| Portland | 32.39 | Attapulgite | 34.46 | Soy Bean | 83.14 | 11.0 | 50 | 0:02 |
| Portland | 35.52 | Attapulgite | 37.78 | Soy Bean | 76.70 | 11.5 | 50 | 0:02 |
| Portland | 38.38 | Attapulgite | 40.83 | Soy Bean | 70.79 | 12.0 | 50 | 0:02 |
| Portland | 41.04 | Attapulgite | 43.63 | Soy Bean | 65.36 | 12.5 | 50 | NP[3] |
| Portland | 43.44 | Attapulgite | 46.21 | Soy Bean | 60.35 | 13.0 | 50 | NP[3] |
| Portland | 45.69 | Attapulgite | 48.61 | Soy Bean | 55.70 | 13.5 | 50 | NP[3] |
| Portland | 47.78 | Attapulgite | 50.83 | Soy Bean | 51.39 | 14.0 | 50 | NP[3] |

[1]The amount of time it takes for the slurry to effectively become non-flowable after the addition of water.
[2]"DNS" indicates that the slurry did not contain enough solids to get a consistent set (i.e., did not set).
[3]"NP" indicated that the slurry is to thick to pump (i.e., non-pumpable).

From the results set forth in Tables I–VII, it can be seen that the cementitious compositions of this invention, which contain Portland cement, clay and vegetable oil, have excellent set properties when contacted with water thereby making them very desirable for use in terminating water flow in a subterranean formation. Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of terminating water flow in a subterranean formation comprising the steps of:
   placing within the subterranean formation a volume of a cementitious composition comprising a hydraulic cementitious material, a viscosifying agent which effectively increases the viscosity of the composition in the presence of water, and a vegetable oil;
   contacting the composition with water from the subterranean formation; and
   allowing the composition to set therein.

2. The method of claim 1 wherein the volume is permitted to penetrate into a zone of the formation by applying pressure against the composition in a well bore.

3. The method of claim 1 wherein said hydraulic cementitious material is Portland cement.

4. The method of claim 1 wherein said viscosifying agent is a clay.

5. The method of claim 4 wherein said clay is selected from the group of bentonite and attapulgite.

6. The method of claim 1 wherein said vegetable oil is selected from the group of corn oil, peanut oil, canola oil, olive oil, soybean oil, sunflower oil and cottonseed oil.

7. The method of claim 1 wherein said vegetable oil is present in the range of from about 35 to about 65 percent by weight of the composition.

8. The method of claim 1 wherein said composition is a pumpable slurry having a density in the range of from about 10 to about 13.5 pounds per gallon.

9. A method of terminating water flow through a space in a well bore comprising the steps of:
   placing within the space a volume of a cementitious composition, said composition comprising a hydraulic cementitious material, a viscosifying agent which effectively increases the viscosity of the composition in the presence of water, and a vegetable oil;
   permitting the volume to penetrate into the space;
   contacting the volume with water; and
   maintaining the volume in the space for a time sufficient to enable the composition to set therein.

10. The method of claim 9 wherein the volume is permitted to penetrate into the space by applying pressure against the composition.

11. The method of claim 9 wherein said hydraulic cementitious material is Portland cement.

12. The method of claim 9 wherein said viscosifying agent is a clay.

13. The method of claim 12 wherein said clay is selected from the group of bentonite and attapulgite.

14. The method of claim 9 wherein said vegetable oil is selected from the group of corn oil, peanut oil, canola oil, olive oil, soybean oil, sunflower oil and cottonseed oil.

15. The method of claim 9 wherein said vegetable oil is present in the range of from about 35 to about 65 percent by weight of the composition.

16. The method of claim 9 wherein said composition is a pumpable slurry having a density in the range of from about 10 to about 13.5 pounds per gallon.

17. A method of terminating water flow in a subterranean formation comprising the steps of:
   placing within the subterranean formation a volume of a cementitious composition comprising Portland cement, bentonite, and a vegetable oil;
   contacting the composition with water from the subterranean formation; and
   allowing the composition to set therein.

18. The method of claim 17 wherein the volume is permitted to penetrate into a zone of the formation by applying pressure against the composition in a well bore.

19. The method of claim 17 wherein said vegetable oil is selected from the group of corn oil, peanut oil, canola oil, olive oil, soybean oil, sunflower oil and cottonseed oil.

20. The method of claim 17 wherein said vegetable oil is present in the range of from about 35 to about 65 percent by weight of the composition.

21. The method of claim 17 wherein said composition is a pumpable slurry having a density in the range of from about 10 to about 13.5 pounds per gallon.

* * * * *